United States Patent
Kimura et al.

(10) Patent No.: US 9,754,699 B2
(45) Date of Patent: Sep. 5, 2017

(54) CAPACITOR OIL HAVING EXCELLENT PROPERTIES IN WIDE TEMPERATURE RANGE

(71) Applicant: JX Nippon Oil & Energy Corporation, Tokyo (JP)

(72) Inventors: Nobuhiro Kimura, Tokyo (JP); Hiroyuki Hoshino, Tokyo (JP); Takahiro Kawaguchi, Tokyo (JP)

(73) Assignee: JX Nippon Oil & Energy Corporation, Tokyo (JP)

( * ) Notice: Subject to any disclaimer, the term of this patent is extended or adjusted under 35 U.S.C. 154(b) by 229 days.

(21) Appl. No.: 14/384,552

(22) PCT Filed: Mar. 5, 2013

(86) PCT No.: PCT/JP2013/055933
§ 371 (c)(1),
(2) Date: Sep. 11, 2014

(87) PCT Pub. No.: WO2013/137055
PCT Pub. Date: Sep. 19, 2013

(65) Prior Publication Data
US 2015/0028269 A1    Jan. 29, 2015

(30) Foreign Application Priority Data
Mar. 13, 2012   (JP) .................. 2012-055825

(51) Int. Cl.
*H01B 3/22* (2006.01)
*H01G 4/22* (2006.01)
*H01G 4/32* (2006.01)
*H01G 4/18* (2006.01)

(52) U.S. Cl.
CPC ............. *H01B 3/22* (2013.01); *H01G 4/18* (2013.01); *H01G 4/221* (2013.01); *H01G 4/32* (2013.01)

(58) Field of Classification Search
None
See application file for complete search history.

(56) References Cited

U.S. PATENT DOCUMENTS

| | | | |
|---|---|---|---|
| 4,523,044 A | 6/1985 | Commandeur et al. | |
| 4,902,841 A | 2/1990 | Kawakami et al. | |
| 5,015,793 A * | 5/1991 | Sato | H01B 3/22 252/570 |
| 5,017,733 A * | 5/1991 | Sato | H01B 3/22 174/17 LF |
| 5,081,757 A * | 1/1992 | Sato | H01B 3/22 29/25.41 |
| 5,081,758 A * | 1/1992 | Sato | H01B 3/22 29/25.41 |
| 2002/0179890 A1* | 12/2002 | Sletson | H01G 4/221 252/570 |
| 2009/0103239 A1 | 4/2009 | Fellers et al. | |
| 2015/0008377 A1* | 1/2015 | Kimura | H01B 3/22 252/578 |
| 2015/0329759 A1* | 11/2015 | Kawaguchi | C09K 5/08 252/73 |

FOREIGN PATENT DOCUMENTS

| | | |
|---|---|---|
| CN | 101643681 A | 2/2010 |
| EP | 0262454 A2 | 4/1988 |
| EP | 1390958 B1 | 4/2007 |
| JP | S57-50708 A | 3/1982 |
| JP | S60-87231 A | 5/1985 |
| JP | S62-180907 A | 8/1987 |
| JP | S63-64217 A | 3/1988 |
| JP | S63-314708 A | 12/1988 |
| JP | H05-28833 A | 2/1993 |

OTHER PUBLICATIONS

Extended Search Report and Opinion issued Oct. 19, 2015 in EP Application No. 13760864.2.
Int'l Search Report issued Apr. 16, 2013 in Int'l Application No. PCT/JP2013/055933.

* cited by examiner

*Primary Examiner* — Joseph D Anthony
(74) *Attorney, Agent, or Firm* — Panitch Schwarze Belisario & Nadel LLP

(57) ABSTRACT

The present invention provides a capacitor oil that can maintain breakdown voltage at a high level in a wide temperature range of −50° C. to 30° C., extremely unlikely precipitates as crystals in particular at −50° C. and thus has excellent properties both at normal temperature and a lower temperature. The capacitor oil of the present invention comprises 1,1-diphenylethane and benzyltoluene, wherein the mass ratio of 1,1-diphenylethane to benzyltoluene is 0.8 to 2.0, the total amount of the ortho-isomer and para-isomer in the benzyltoluene is 90 percent by mass or less, and the composition has a 40° C. kinematic viscosity of 3.00 mm$^2$/s or lower.

19 Claims, No Drawings

CAPACITOR OIL HAVING EXCELLENT PROPERTIES IN WIDE TEMPERATURE RANGE

CROSS-REFERENCE TO RELATED APPLICATION

This application is a Section 371 of International Application No. PCT/JP2013/055933, filed Mar. 5, 2013, which was published in the Japanese language on Sep. 19, 2013, under International Publication No. WO 2013/137055 A1, and the disclosure of which is incorporated herein by reference.

TECHNICAL FIELD

The present invention relates to capacitor oils having excellent properties in a wide temperature range.

BACKGROUND ART

Examples of properties that a capacitor oil is mainly required to have include high breakdown voltage, high hydrogen gas absorbability, low viscosity and low melting point. In recent years, electrical insulating oils with a high breakdown voltage are being used worldwide. Unlike the past years, an electrical insulating oil having such excellent low temperature properties that make it possible to be used in extremely low temperature districts where such an oil has never been used before has been demanded, accompanied with economic growth. It is known that if solids are produced in an electrical insulating oil during the use thereof, discharge is likely to occur from the solidified portions. Therefore, an electrical insulating oil from which some components are likely to precipitate as solids under this environment cannot be used. Whilst, as the temperature at which an electrical insulating oil may be used depends on the temperature of the environment of usage thereof, the oil needs to have not only properties at extremely-low temperatures but also properties in the vicinity of 20 to 30° C.

Over a long period of time, a mixture of benzyltoluene and dibenzyltoluene has been used as an electrical insulating oil with a high breakdown voltage. Although benzyltoluene is high in aromatic carbon ratio per molecule, high in hydrogen gas absorbability and excellent in withstand voltage characteristics, according to some literatures, the melting points of 3 types of positional isomer of benzyltoluene, i.e., o-isomer, m-isomer and p-isomer are +6.6° C., −27.8° C. and +4.6° C., respectively, and thus cannot be deemed low.

In order to solve such problems, Japanese Patent Application Laid-Open Publication No. 60-87231 (Patent Literature 1) has proposed to mix benzyltoluene produced by reacting toluene and benzyl chloride with a ferric chloride catalyst, with dibenzyltoluene that is a coproduct. ARKEMA has commercialized an electrical insulating oil composition under the name of "JARYLEC C-101" which is the same in technical sense as the proposal of Patent Literature 1. Patent Literature 1 discloses an oligomer mixture of triarylmethane, which is, however, substantially a mixture of benzyltoluene and dibenzyltoluene. Patent Literature 1 describes at page 3 "monobenzyltoluene has a defect that it crystallizes at −20° C. after supercooling" and therefore, the composition is produced by mixing dibenzyltoluene to restrain the crystallization.

However, addition of compounds such as dibenzyltoluene is not a good measure for the following three reasons. That is, even though the freezing point depression could be expected by addition of dibenzyltoluene, it is not decreased as much as the mass of the addition of dibenzyltoluene due to the high molecular weight thereof. The freezing point depression occurs proportionally to the mol concentration of the material to be added, but with the amount of dibenzyltoluene in the order of 20 percent by mass as added in the above-described product JARYLEC C-101, the crystallization temperature can be decreased only by 6 to 8° C. when calculated from the mol concentration.

Secondly, dibenzyltoluene merely increases the viscosity of an insulating oil and thus decreases the mobility of the solution molecules thereby apparently restrains the oil from precipitating. Therefore, the precipitation of the oil as crystals can be found if carefully cooling the oil.

The third reason is that dibenzyltoluene has high biological accumulation properties. In recent years, Stockholm Convention or the like has started to impose an international restriction on substances having a high toxicity. Although no such a restriction has been imposed on dibenzyltoluene itself, it has been designated as Type I Monitoring Chemical Substance in Japan due to its high biological accumulation properties. The use of this substance is allowed in the form of essential use where the purposes of use are restricted, but from now, tightening of regulations on the high toxicity substances is inevitable, and thus alternative materials with a low toxicity have been demanded.

Japanese Patent Application Laid-Open Publication No. 62-180907 (Patent Literature 2) discloses an electrical insulating oil composed of benzyltoluene and describes about the relationship between the ratio of each isomer in the benzyltoluene and the properties of the insulating oil. The melting point of an isomer mixture is −43° C. or higher, and thus the insulating oil is not sufficient in low temperature properties.

Japanese Patent Application Laid-Open Publication No. 63-64217 (Patent Literature 3) describes an electrical insulating oil comprising benzyltoluene and ditolylmethane, and from the description, it is appreciated that the properties of the oil is significantly varied on the type of substances to be blended and the blend ratio thereof. That is, an electrical insulating oil infrequently brings out properties as unexpected by theory depending on substances to be blended.

Onthe other hand, 1-phenyl-1-xylylethane or 1-phenyl-1-ethylphenylethane is easily produced and has excellent properties such as relatively high breakdown voltage and small dielectric loss and thus have been widely used. For example, a composition comprising 1-phenyl-1-(2,4-dimethylphenyl)ethane or 1-phenyl-1-(2,5-dimethylphenyl)ethane has been proposed as an electrical insulating oil composition which is excellent in breakdown voltage and dielectric loss and also particularly excellent in oxidation stability (Japanese Patent Application Laid-Open Publication No. 57-50708: Patent Literature 4).

However, an electrical insulating oil composition comprising 1-phenyl-1-xylylethane or 1-phenyl-1-ethylphenylethane has a pour point of −47.5° C. or lower and a very low melting point but has a problem that it is not sufficient in insulation properties for a capacitor in particular in a low temperature range of 0° C. or lower because its 40° C. viscosity is in the order of 5.0 mm$^2$/s, which is high.

Meanwhile, 1,1-diphenylethane is high in breakdown voltage and hydrogen gas absorbability and has a 40° C. viscosity of 2.8 mm$^2$/s and a freezing point of −18° C., which is low and thus is a potential substance for an electrical insulating oil with an excellent low temperature properties. Although 1,1-diphenylethane is low in freezing point, it cannot be used alone in a temperature range which is lower than the freezing point.

CITATION LIST

Patent Literature

Patent Literature 1: Japanese Patent Application Laid-Open Publication No. 60-87231
Patent Literature 2: Japanese Patent Application Laid-Open Publication No. 62-180907
Patent Literature 3: Japanese Patent Application Laid-Open Publication No. 63-64217
Patent Literature 4: Japanese Patent Application Laid-Open Publication No. 57-50708

SUMMARY OF INVENTION

Technical Problem

The present invention has an object to provide a capacitor oil that can maintain breakdown voltage at a high level in a wide temperature range of −50° C. to 30° C. and extremely unlikely precipitates as crystals in particular at −50° C.

Solution to Problem

As the result of extensive studies and researches carried out to achieve the above-described object, the present invention has been completed on the basis of the finding that a capacitor oil which is excellent in a wide temperature range of −50 to 30° C. was able to be produced by providing a mixture of 1,1-diphenylethane and benzyltoluene and varying the ratio therebetween and the ratio of the isomers of the benzyltoluene.

That is, the present invention relates to a capacitor oil comprising 1,1-diphenylethane and benzyltoluene, wherein the mass ratio of 1,1-diphenylethane to benzyltoluene is 0.8 to 2.0, the total amount of the ortho-isomer and para-isomer in the benzyltoluene is 90 percent by mass or less, and the composition has a 40° C. kinematic viscosity of 3.00 mm$^2$/s or lower.

The present invention also relates to the above-described capacitor oil further comprising an epoxy compound in an amount of 0.01 to 1.0 percent by mass.

The present invention also relates to the above-described capacitor oil wherein the chlorine content is 1 ppm by mass or less.

The present invention also relates to a capacitor comprising a dielectric impregnated with the above-described capacitor oil and at least partially composed of a polypropylene film.

Advantageous Effect of Invention

The capacitor oil of the present invention is a capacitor oil that extremely unlikely precipitates as crystals and has properties that enables an oil-impregnated capacitor impregnated with the oil to be practically used at a low temperature of −50° C., and excellent properties in a wide temperature range to exhibit a high breakdown voltage even at 30° C. The capacitor oil of the present invention comprises components, each of which does not adversely affect living bodies. Therefore, the capacitor oil is extremely excellent in practical use.

DESCRIPTION OF EMBODIMENTS

The present invention will be described in more detail below.

The capacitor oil of the present invention comprises a diarylalkane mixture of 1,1-diphenylethane and benzyltoluene.

The blend ratio (1,1-DPE/BT) of 1,1-diphenylethane (1,1-DPE) to benzyltoluene (BT) is necessarily from 0.8 to 2.0 by mass ratio. As benzyltoluene is higher in melting point than 1,1-diphenylethane, the ratio of 1,1-diphenylethane to benzyltoluene of below 0.8 leads to a capacitor oil which is relatively likely to precipitates as crystals. If the ratio of 1,1-diphenylethane to benzyltoluene exceeds 2.0, the resulting oil would be insufficient in eutectic effect.

Although benzyltoluene is high in hydrogen gas absorbability and low in viscosity, it is not satisfactory for use at −50° C. because the melting points of the o-isomer, m-isomer and p-isomer are +6.6° C., −27.8° C. and +4.6° C., respectively, as described above. In the present invention, the total amount of the ortho-isomer and para-isomer in the benzyltoluene is preferably 90 percent by mass or less, more preferably 80 percent by mass or less, more preferably 60 percent by mass or less. If the total amount of the ortho-isomer and para-isomer exceeds 90 percent by mass, the resulting oil would likely precipitate as crystals.

Even when the capacitor oil comprising 1,1-diphenylethane and benzyltoluene comprises hydrocarbons other than 1,1-diphenylethane and benzyltoluene, such as alkylbenzenes and cycloalkylbenzenes having 12 to 18 carbon atoms, bicyclic aromatic or polycyclic aromatic, the total amount of 1,1-diphenylethane and benzyltoluene is preferably 90 percent by mass or more, more preferably 95 percent by mass or more, most preferably 98 percent by mass or more. If the total amount is less than 90 percent by mass, the resulting oil would be reduced in breakdown voltage.

The higher the viscosity of the capacitor oil, the more unlikely the oil circulates in a capacitor (convection) and thus the more unlikely the heat generated by discharge is removed. Therefore, the lower viscosity is preferred. The 40° C. kinematic viscosity is thus necessarily 3.00 mm$^2$/s or lower, preferably 2.70 mm$^2$/s or lower.

Since benzyltoluene is produced by reacting benzyl chloride with toluene as described above, a considerable amount of chlorine is contained in the capacitor oil. It has been found that chlorine degrades the properties of a capacitor oil. Therefore, the chlorine content in the capacitor oil is preferably 50 ppm by mass or less, more preferably 10 ppm by mass or less, particularly preferably 1 ppm by mass or less. If the chlorine content is large, the capacitor oil would be degraded in properties. Although the capacitor oil is treated with an activated earth in order to remove polar substances that adversely affect the properties of the capacitor oil, the chlorine concentration is necessarily decreased during the production of the capacitor oil due to the difficulty of treating organic chlorines with an activated earth content.

The capacitor oil of the present invention extremely unlikely precipitates as crystals and thus an oil-immersed capacitor impregnated with the capacitor oil has a practical feature that it can be used even at a low temperature of −50° C.

The capacitor oil of the present invention is fluidized at a temperature of −50° C. The crystal precipitation temperature of the capacitor oil of the present invention is preferably −50° C. or lower. A crystal precipitation temperature of higher than −50° C. is not preferable because the capacitor oil would be poor in insulation properties at low temperatures.

Confirmation of whether an oil is fluidized and measurement of the crystal precipitation temperature were carried out by keeping samples at a temperature of −50° C. for 1030 hours and then visually observing the fluidized state of the samples and whether or not the samples precipitate as crystals. Examples given below describe the detailed evaluation methods, confirmation of the fluidized state and observation of whether or not oils precipitate as crystal after being kept at a temperature of −50° C. for 1030 hours.

The capacitor oil is enhanced in dielectric dissipation factor due to the presence of water or polar substances, but would be poor in insulation properties if the dielectric dissipation factor is enhanced and thus degraded in properties of an electrical insulating oil. In order to avoid the degradation of the properties, removal of water and polar substance by contacting the oil with an activated earth can lower the dielectric dissipation factor and thus improve the properties. No particular limitation is imposed on the activated earth. Although no particular limitation is imposed on the shape of the activated earth, it is preferably a molded shape from the practical viewpoint. Since chlorines cannot be always removed with an activated earth, an epoxy compound is added as a trapping agent of hydrogen chloride. As the epoxy compound is removed to some extent by being contacted with an activated earth, it is desirously added after the electrical insulating oil is treated with an activated earth.

Examples of the epoxy compound include alicyclic epoxy compounds such as 3,4-epoxycyclohexylmethyl-3,4-epoxy-cyclohexane carboxylate, vinylcyclohexene diepoxide and 3,4-epoxy-6-methylcyclohexylmethyl(3,4-epoxy-6-methylhexane)carboxylate and bisphenol-A diglycidyl ether type epoxy compounds such as phenol novolac type epoxy compounds and ortho-cresol novolac epoxy compounds. The epoxy compound is added in an amount of 0.01 to 1.0 percent by mass, preferably 0.3 to 0.8 percent by mass on the basis of the total mass of the electric insulating composition. If the amount is less than 0.01 percent by mass, the epoxy compound would fail to exhibit sufficiently an effect of trapping chlorines. If the amount is more than 1.0 percent by mass, the resulting capacitor oil would be poor in electric characteristics and thus would be dielectric loss in a capacitor and generate heat, thereby degrading the properties of the capacitor.

The capacitor oil of the present invention is suitable for impregnating an oil-impregnated capacitor containing a plastic film in at least a part of an insulating material or dielectric material.

Examples of the plastic film include polyester and polyvinylidene fluoride and polyolefin films such as polypropylene and polyethylene, among which polyolefin films are suitable. A polypropylene film is particularly preferable.

An oil-impregnated capacitor suitable for the present invention is produced by winding a conductor formed of metal foil such as aluminum together with the above-described plastic film as insulating material or dielectric material and if necessary also other materials such as an insulating paper, followed by impregnation with an insulating oil by a conventional method. Alternatively, an oil-impregnated capacitor suitable for the present invention is also produced by forming a metalized plastic film by depositing a metal conductor layer of aluminum or zinc on the above-described plastic film as an insulating material or dielectric material and winding the film if necessary together with a plastic film or insulating paper, followed by impregnation with an insulating oil by a conventional method.

EXAMPLES

The present invention will be described in more detail with the following examples but is not limited thereto.

Example 1

A mixed oil was prepared to comprise 60 percent by mass of 1,1-diphenylethane and 40 percent by mass of benzyltoluene and subjected to the following crystallization experiment at −50° C. (Experimental Example A) and experiments for evaluating test oils with a model capacitor (Experimental Example B). In Experimental Example B, the above mixed oil is mixed with the epoxy compound described in Experimental Example B. The results are set forth in Table 1. The benzyltoluene used in this example was an isomer mixture of 3 percent by mass of ortho-isomer, 51 percent by mass of meso-isomer and 46 percent by mass of para-isomer, prepared by blending an isomer mixture (o-isomer 4 percent by mass, m-isomer 59 percent by mass, p-isomer 37 percent by mass) produced by following the procedures of Reference Production Example of Japanese Patent Publication No. 8-8008 and each isomer of the benzyltoluene produced by following the production of an electrically insulating oil described in Japanese Patent Application Laid-Open Publication No. 62-180907.

Example 2

A mixed oil was prepared to comprise 50 percent by mass of 1,1-diphenylethane and 50 percent by mass of benzyltoluene and subjected to Experimental Examples A and B described below. The results are set forth in Table 1. The benzyltoluene used in this example was the same as that of Example 1.

Example 3

A mixed oil was prepared to comprise 60 percent by mass of 1,1-diphenylethane and 40 percent by mass of benzyltoluene and subjected to Experimental Examples A and B described below. The results are set forth in Table 1. The benzyltoluene used in this example was an isomer mixture of 24 percent by mass of ortho-isomer, 28 percent by mass of meso-isomer and 48 percent by mass of para-isomer, prepared by blending an isomer mixture (o-isomer 4 percent by mass, m-isomer 59 percent by mass, p-isomer 37 percent by mass) produced by following the procedures of Reference Production Example of Japanese Patent Publication No. 8-8008 and each isomer of the benzyltoluene produced by following the production of an electrically insulating oil described in Japanese Patent Application Laid-Open Publication No. 62-180907.

Example 4

The following Experimental Example A was carried out using the same mixed oil as that of Example 3 and the following Experimental Example B was also carried out with the same procedures except that the amount of the epoxy compound was changed to 0.95 percent by mass.

Example 5

The following Experimental Example A was carried out using the same mixed oil as that of Example 3 and the following Experimental Example B was also carried out with the same procedures except that the epoxy compound was not added.

Comparative Example 1

A mixed oil was prepared to comprise 73 percent by mass of 1,1-diphenylethane and 27 percent by mass of benzyltoluene and subjected to Experimental Examples A and B described below. The results are set forth in Table 1. The benzyltoluene used in this example was the same as that of Example 1. The oil precipitated as crystals after 1030 hours in Experimental Example A, but in Experimental Example B the breakdown voltage could be measured because it took about 200 hours to complete the measurement.

Comparative Example 2

A mixed oil was prepared to comprise 20 percent by mass of 1,1-diphenylethane and 80 percent by mass of benzyltoluene and subjected to Experimental Example A described below. The results are set forth in Table 1. The benzyltoluene used in this example was the same as that of Example 1. Experimental Example B was not carried out because the oil fully solidified before it passed 1030 hours.

Comparative Example 3

A mixed oil was prepared to comprise 60 percent by mass of 1,1-diphenylethane and 40 percent by mass of benzyltoluene and subjected to Experimental Examples A and B described below. The results are set forth in Table 1. The benzyltoluene used in this example was an isomer mixture of 44 percent by mass of ortho-isomer, 6 percent by mass of meso-isomer and 50 percent by mass of para-isomer, prepared by blending an isomer mixture (o-isomer 4 percent by mass, m-isomer 59 percent by mass, p-isomer 37 percent by mass) produced by following the procedures of Reference Production Example of Japanese Patent Publication No. 8-8008 and each isomer of the benzyltoluene produced by following the production of an electrically insulating oil described in Japanese Patent Application Laid-Open Publication No. 62-180907.

Comparative Example 4

A mixed oil was prepared to comprise 80 percent by mass of benzyltoluene and 20 percent by mass of dibenzyltoluene and subjected to Experimental Examples A and B described below. The results are set forth in Table 1. The benzyltoluene used in this example was the same as that of Comparative Example 3.

Comparative Example 5

A mixed oil was prepared to comprise 66 percent by mass of 1,1-diphenylethane and 34 percent by mass of benzyltoluene and subjected to Experimental Examples A and B described below. The results are set forth in Table 1. The benzyltoluene used in this example was the same as that of Comparative Example 3.

Experimental Example A

Crystallization Experiment at −50° C.

Concerning the relationship of temperature and crystallization, an capacitor oil does not desirously precipitate as crystals until the lowest acceptable temperature of −50° C. reached in order to maintain the properties of a capacitor. In order to confirm the crystal precipitation of the capacitor oils, the oils of Examples 1 to 5 and Comparative Examples 1 to 5 (hereinafter referred to as "test oils") were each put into a 100 ml sample bottle, left in a low temperature thermostatic bath, the temperature of which was then kept for 1030 hours and thereafter whether crystals precipitated or not was visually observed. The results are set forth in Table 1. "Good" denotes a state where the oil exhibited transparency and no crystal precipitation was observed in the oil while "Bad" denotes a state where the oil exhibited no transparency and was fluidized although it partially precipitated as crystals or a state where the oil precipitated as crystals and solidified as the whole. The insulating oil compositions of the present invention did not solidify even at −50° C. or lower and thus can maintain the properties of a capacitor until the lowest acceptable temperature reaches.

Experimental Example B

Evaluation of Test Oils using a Model Capacitor

The capacitor used in this experiment was as follows. The solid insulating material used herein was a simultaneously biaxially stretched polypropylene film of easy-impregnation type that was manufactured by Shin-Etsu Film Co., Ltd. through a tubular method.

Two sheets of this polypropylene film of a 12.7 μm thickness (weight method) were wound together with two sheets of aluminum foil electrode to produce a capacitor device of 0.2 to 0.3 μF in electrostatic capacity, which was then put in an tin can. The can was made flexible so as to compensate sufficiently the shrinkage of an insulating oil at low temperatures. The end portions of the electrode was slit but was kept unfolded.

A method for connecting between the electrode and the terminal is generally used, in which a ribbon-shaped lead foil is inserted into the device. However, if an oil precipitates as crystals, this method undergoes a loose connection between the lead foil and the electrode surface and as the result causes partial discharge from the electrode, possibly resulting in a failure to the measurement. Therefore, in the present experiment, similarly to a method used for a high frequency capacitor, the ends of the electrodes protruding beyond the respective edges of the polypropylene films were crimped and then one of the ends was spot-welded to lead wires.

The can-type capacitor thus prepared was subjected to vacuum drying in a conventional manner, and under the same vacuum condition, it was impregnated with an insulating oil, followed by sealing. The capacitor was then subjected to heat treatment at a maximum temperature of 80° C. for two days and nights in order to maintain the impregnation uniformly and stably. After leaving it to stand at room temperature for 5 days or longer, the capacitor was applied with AC 1270 V (corresponding to 50 V/μm) in a thermostatic bath kept at 30° C. for 16 hours and then was used for an experiment.

Two sheets of polypropylene film of 12.7 μm thick were laminated to be used as a dielectric material, and wound and laminated together with an electrode of aluminum foil in accordance with a conventional manner thereby producing a model capacitor for oil-impregnation.

This capacitor was impregnated with each mixed oil under vacuum to produce an oil-impregnated capacitor with a capacitance of 0.26 μF. Before impregnation, each of the electrical insulating oil compositions was pre-treated with an activated earth. That is, an activated earth galeonite #036, manufactured by MI ZUSAWA INDUSTRIAL CHEMICALS, LTD. was added in an amount of 10 percent by mass to each of the. electrical insulating oil compositions and stirred at a liquid temperature of 25° C. for 30 minutes and then filtered. After filtration, 0.65 percent by mass of a chlorine trapping agent that is an epoxy compound (alicyclic epoxide; product name: CELLOXIDE 2021P manufactured by Daicel Corporation) was added and used for impregnation.

Thereafter, the oil-impregnated capacitors were applied with an alternating voltage at a predetermined temperature by a predetermined method to obtain the breakdown voltage from the voltage and time at which the capacitor had insulation breakdown in accordance with the following formula. The predetermined method for applying voltage is a method wherein an applied voltage is continuously raised from a potential gradient of 50 v/μm at a rate of 10 v/μm every 24 hours.

Breakdown voltage (v/μm)=V+S×(T/1440)

wherein V: applied voltage (v/μm) at insulation breakdown

S: raised voltage (v/μm) every 24 hours

T: time period till insulation breakdown occurs after raising applied voltage (minute)

TABLE 1

| | Capacitor oil composition | | | | | | | | | | Experiment A Crystal precipitation | Experiment B Breakdown voltage V/μm | | 40° C. kineMatic viscosity |
|---|---|---|---|---|---|---|---|---|---|---|---|---|---|---|
| | | | | Isomer ratio in BT | | | Ortho-isomer/ Para-isomer | 1,1-DPE/ BT | Chlorine content | Epoxy compound | | | | |
| | 1,1-DPE | BT | DBT | Ortho-isomer | Metha-isomer | Para-isomer | | | | | | −50° C. | 30° C. | mm²/s |
| Example 1 | 60 | 40 | 0 | 3 | 51 | 46 | 49 | 1.5 | 0.0 | 0.65 | Good | 101 | 148 | 2.61 |
| Example 2 | 50 | 50 | 0 | 3 | 51 | 46 | 49 | 1.0 | 0.0 | 0.65 | Good | 100 | 148 | 2.53 |
| Example 3 | 60 | 40 | 0 | 24 | 28 | 48 | 72 | 1.5 | 0.6 | 0.65 | Good | 101 | 143 | 2.66 |
| Example 4 | 60 | 40 | 0 | 24 | 28 | 48 | 72 | 1.5 | 0.6 | 0.95 | Good | 103 | 147 | 2.66 |
| Example 5 | 60 | 40 | 0 | 24 | 28 | 48 | 72 | 1.5 | 0:6 | 0.00 | Good | 100 | 141 | 2.66 |
| Comparative Example 1 | 73 | 27 | 0 | 3 | 51 | 46 | 49 | 2.7 | 0.0 | 0.65 | Bad | 78 | 140 | 2.65 |
| Comparative Example 2 | 20 | 80 | 0 | 3 | 51 | 46 | 49 | 0.3 | 1.2 | 0.65 | Bad | — | — | 2.46 |
| Comparative Example 3 | 60 | 40 | 0 | 44 | 6 | 50 | 94 | 1.5 | 0.0 | 0.65 | Good | 102 | 138 | 2.70 |
| Comparative Example 4 | 0 | 80 | 20 | 44 | 6 | 50 | 94 | 0.0 | 3.0 | 0.65 | Bad | 91 | 148 | 3.55 |
| Comparative Example 5 | 66 | 34 | 0 | 44 | 6 | 50 | 94 | 1.9 | 0.0 | 0.65 | Bad | 100 | 135 | 2.73 |

In Table 1, 1,1-DPE denotes 1,1-diphenylethane, BT denotes benzyltoluene, and DBT denotes dibenzyltoluene.

In Experiment B, the test oils of Examples 1 to 5 exhibited breakdown voltages of 100 V/μm or higher at −50° C. and 140 V/μm or higher at 30° C. and thus was confirmed that they exhibited sufficient electric insulation properties and thus can be deemed a capacitor oil exhibiting superior properties in a wide temperature range of −50 to 30° C.

INDUSTRIAL APPLICABILITY

The capacitor oil of the present invention is excellent in properties in a wide temperature range of −50° C. to 30° C. Furthermore, since each component of the oil gives no adverse effect on living bodies, the oil of the present invention is extremely excellent for practical use as an electrical insulating oil composition.

The invention claimed is:

1. A capacitor oil comprising 1,1-diphenylethane and benzyltoluene, wherein the mass ratio of 1,1-diphenylethane to benzyltoluene is 0.8 to 2.0, the total amount of the ortho-isomer and para-isomer in the benzyltoluene is 90 percent by mass or less and more than 72 percent by mass, and the oil has a 40° C. kinematic viscosity of 3.00 mm²/s or lower.

2. The capacitor oil according to claim 1 further comprising an epoxy compound in an amount of 0.01 to 1.0 percent by mass.

3. The capacitor oil according to claim 1 wherein the chlorine content is 1 ppm by mass or less.

4. A capacitor comprising a dielectric impregnated with the capacitor oil according to claim 1 and at least partially composed of a polypropylene film.

5. The capacitor oil according to claim 2 wherein the chlorine content is 1 ppm by mass or less.

6. A capacitor comprising a dielectric impregnated with the capacitor oil according to claim 2 and at least partially composed of a polypropylene film.

7. A capacitor comprising a dielectric impregnated with the capacitor oil according to claim 3 and at least partially composed of a polypropylene film.

8. The capacitor oil according to claim 1 wherein the oil has breakdown voltages of 100V/μm or higher at −50° C. and 140V/μm or higher at −30° C.

9. The capacitor oil according to claim 2 wherein the oil has breakdown voltages of 100V/μm or higher at −50° C. and 140V/μm or higher at −30° C.

10. The capacitor oil according to claim 3 wherein the oil has breakdown voltages of 100V/μm or higher at −50° C. and 140V/μm or higher at −30° C.

11. A capacitor comprising a dielectric impregnated with the capacitor oil according to claim 8 and at least partially composed of a polypropylene film.

12. A capacitor comprising a dielectric impregnated with the capacitor oil according to claim 9 and at least partially composed of a polypropylene film.

13. A capacitor comprising a dielectric impregnated with the capacitor oil according to claim 10 and at least partially composed of a polypropylene film.

14. The capacitor oil according to claim 1 wherein the oil has a 40° C. kinematic viscosity of 2.66 mm²/s or higher.

15. The capacitor oil according to claim 1 wherein the oil has a crystal precipitation temperature of −50° C. or lower.

16. A capacitor oil comprising 1,1-diphenylethane and benzyltoluene, wherein the mass ratio of 1,1-diphenylethane to benzyltoluene is 0.8 to 2.0, the total amount of the ortho-isomer and para-isomer in the benzyltoluene is 90 percent by mass or less and the oil has a 40° C. kinematic viscosity of 2.66 to 3.00 mm$^2$/s and a crystal precipitation temperature of −50° C. or lower.

17. The capacitor oil according to claim 16 further comprising an epoxy compound in an amount of 0.01 to 1.0 percent by mass.

18. The capacitor oil according to claim 16 wherein the chlorine content is 1 ppm by mass or less.

19. A capacitor comprising a dielectric impregnated with the capacitor oil according to claim 16 and at least partially composed of a polypropylene film.

* * * * *